July 19, 1932.　　A. ESPANTOSO　　1,868,004
DIGGING MACHINE
Filed Feb. 27, 1931　　2 Sheets-Sheet 1

INVENTOR
BY Angel Espantoso
ATTORNEY

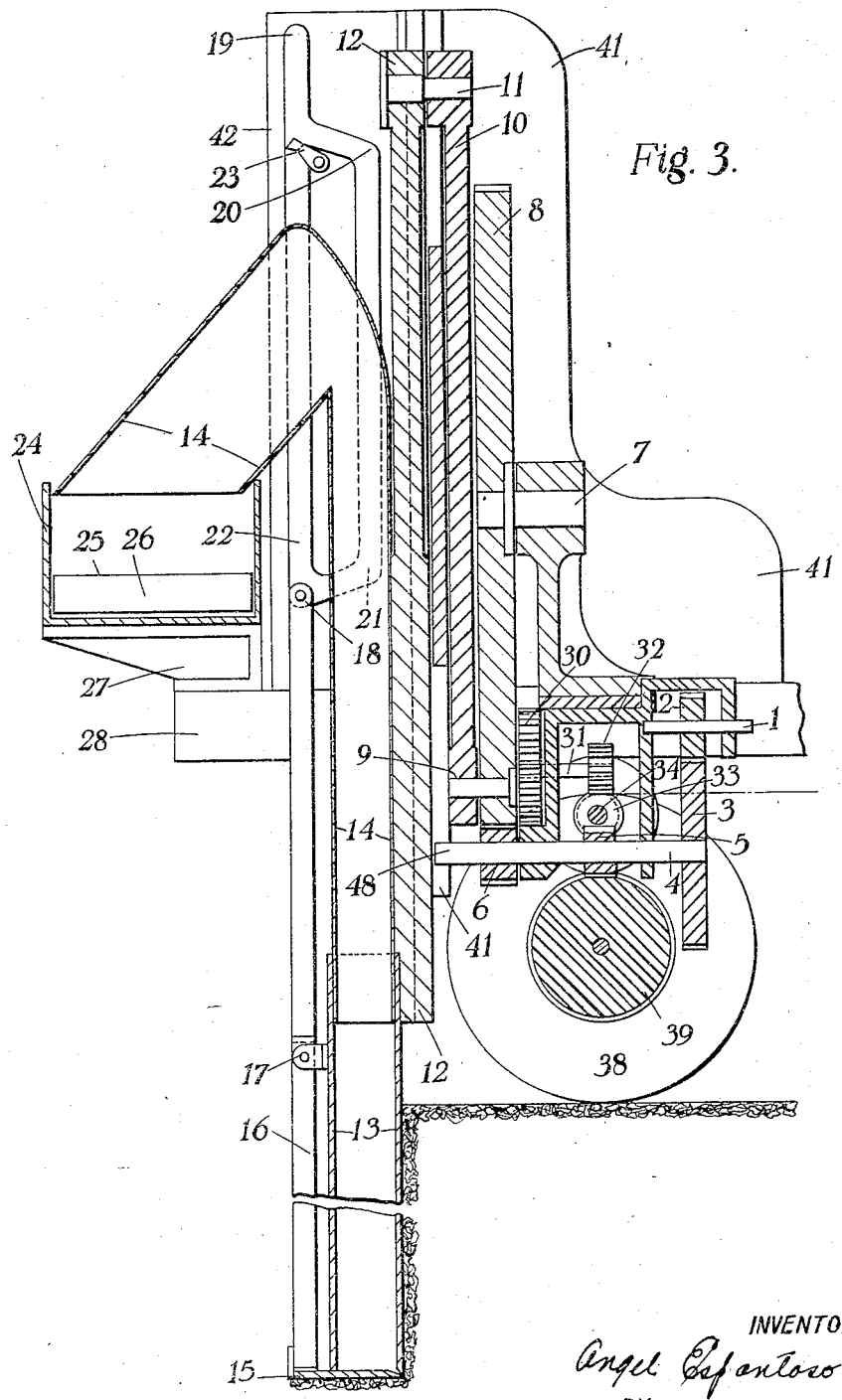

Patented July 19, 1932

1,868,004

UNITED STATES PATENT OFFICE

ANGEL ESPANTOSO, OF LONDON, ENGLAND

DIGGING MACHINE

Application filed February 27, 1931, Serial No. 518,794, and in Great Britain March 24, 1930.

This invention relates to digging, ditching or trenching machines in which a mechanically operated reciprocating box cutter is mounted upon a tractor and a coacting jaw is so arranged that it takes up a position in which it closes the cutting end of the cutter when the latter has reached substantially the end of its downward stroke and remains in such a position substantially throughout the upward stroke of the cutter so that material which has been severed by the cutter in its downward stroke is carried upwards within it.

The primary object of the invention is to provide improved means for removing the soil or other material dug up by the machine.

In a machine constructed in accordance with the invention the end of a stationary discharge conduit fits telescopically the upper end of the cutter so that during the upward stroke of the cutter the material in the latter is forced into the conduit, and is ultimately discharged from the other end thereof.

Figure 1:
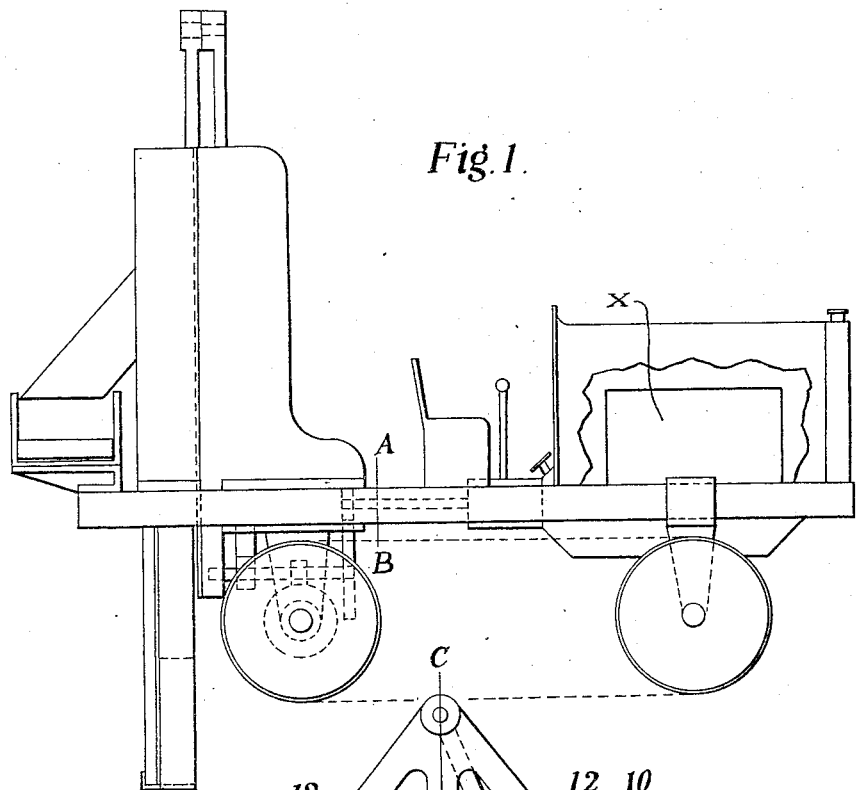
Figure 2:
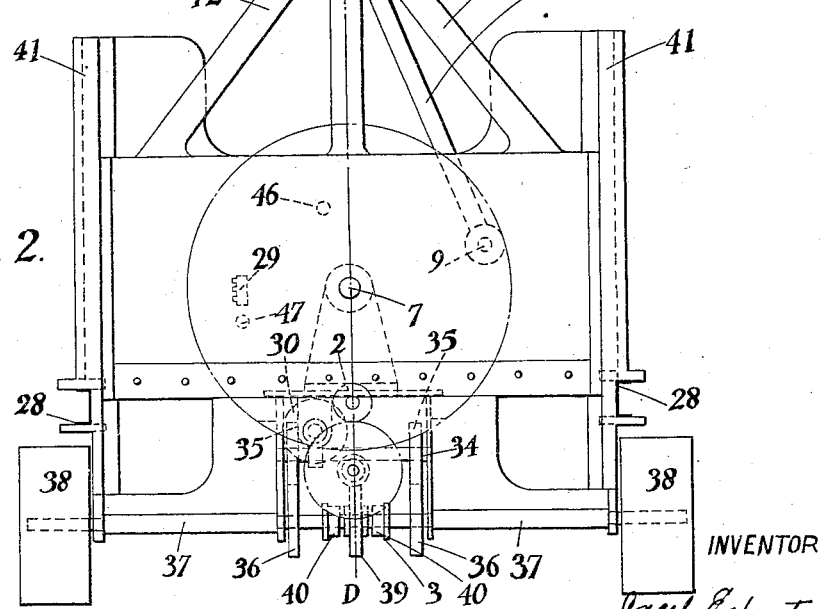

In the accompanying drawings, which show by way of example one machine in accordance with the invention and one modification thereof, Figure 1 is a side elevation of the machine;
Figure 2 an end elevation with the cutter removed;
Figure 3 a section to an enlarged scale of the part on the line C—D of Figure 2 showing the part of the machine to the left of the line A—B of Figure 1.

Figure 1 shows, somewhat diagrammatically, a tractor carrying, at its rear end, digging apparatus. A gasoline motor X is located, in the usual manner, at the forward end of the tractor under a bonnet, part of which is shown broken away. A shaft 1 (see Figure 3) is connected to the motor X through the medium of a universal joint and gear box. The gear 2 is in constant mesh with a gear 3 keyed rigidly at the forward end of a shaft 4.

The shaft 4 carries a skew gear 5 which is keyed in the position shown in Figure 3, and drives a skew gear 39 mounted upon and free to revolve about axles 37. When the machine is moving from one scene of operations to another, jaw clutches 40, which can slide along splines provided on the axles 37, are engaged with jaws on faces of the gear 39, so that the drive is transmitted to the endless track driving sprockets 38. The clutches 40 are disengaged when the machine is in position to start digging or trenching.

At the rear end of the shaft 4 is another splined spur pinion 6, which when in the position shown operates a cast iron spur gear 8 mounted on a shaft 7. When the machine is not working the gear 6 is slid to the extreme end of the shaft 4. A crank pin 9 is screwed into a locating hole in the gear 8. In order to vary the depth of cutting the crank pin may be transferred to one of two alternative locating holes 46 and 47 at different radial distances from the axis of the gear 8. The crank pin 9 carries a connecting rod 10 which is pivoted at the end remote from the crank pin to a link pin 11 mounted on a slide 12. The slide 12 is constrained to reciprocate vertically by a stationary slide-guide 41 bolted to a frame 28. At the lower end of the slide 12 is fixed a cutter 13 of rectangular cross-section and within which is located the end of of a stationary chute 14 of similar configuration, which fits the cutter sufficiently freely to allow it to slide up and down outside it. Arms 16 carrying a jaw 15 are pivoted to the spade 13 at 17. The action of the jaw 15 is controlled by rollers 18, mounted at the upper end of the arm 16, and guide slots 19, 20, 21 and 22 formed in guide plates 42. One-way catches 23 are provided to allow the rollers 18 to pass when ascending but to divert them and so open the jaw again when descending.

A hopper 24, mounted transversely across the frame 28 by means of brackets 27, is provided; this carries an endless discharge conveyor 25 driven in either direction by rollers 26, the rollers obtaining their motive power from a flexible shaft suitably mounted and driven by the motor. However, the soil may also be discharged onto an inclined plane. The sequence of operation is as follows:—

When the machine is in position for digging, the pinion 6 is slid into the position shown, the clutches 40 having been previously disengaged. The pinion 6 drives the gear 8 which, through the medium of the crank pin 9 connecting the rod 10 and link pin 11, imparts a vertically reciprocating action to the slide 12. The slide 12 forces the cutter 13 into the ground to the desired depth. When the cutter 13 reaches the end of its stroke the jaw 15 closes and the upward stroke begins. During the upward stroke earth sod is forced into the inner chute 14, and passes thence to the endless belt 25 to be discharged at the side of the cutting. At the instant the cutter leaves the ground a gear sector 29, mounted on the engine side of the gear 8, engages with a gear 30, causing it to turn a shaft 31 and skew gear 32 through a part of a revolution. The skew gear 32 is in constant mesh with a skew gear 33 which is keyed in position on a transverse shaft 34. At either end of the shaft 34 is fixed a spur gear 35 engaging with spur gears 36 keyed to the axles 37. By this means the endless track sprockets 38 are turned through a part of a revolution and the machine is moved forward into position for the next cutting stroke.

I claim:

1. A digging machine comprising in combination a tractor, a mechanically operated box cutter mounted upon said tractor, a motor operative to reciprocate said cutter also mounted on said tractor, said cutter being constrained to reciprocate to and from a point below said tractor, a jaw coacting with said cutter and operative to take up a position such that it closes the cutting end of said box cutter when the latter is substantially at the end of its downward stroke and to maintain such a position substantially throughout the upward stroke of said cutter and a discharge conduit having its inlet end telescopically fitting said cutter in all positions of the latter, the length of said box cutter being at least as great as its stroke.

2. A digging machine comprising in combination a tractor, a mechanically operated box cutter mounted upon said tractor, a motor operative to reciprocate said cutter also mounted on said tractor, said cutter being constrained to reciprocate to and from a point below said tractor, means whereby the stroke of said cutter may be adjusted, a jaw coacting with said cutter and operative to take up a position such that it closes the cutting end of said box cutter when the latter is substantially at the end of its downward stroke and to maintain such a position substantially throughout the upward stroke of said cutter and a discharge conduit having its inlet end telescopically fitting within said cutter in all positions of the latter, the length of said box cutter being at least as great as its maximum stroke.

3. A digging machine comprising in combination a tractor, a box cutter mounted upon said tractor, a motor also mounted upon said tractor, a crank, a connecting rod, said crank and said connecting rod being adapted to be pivoted together at any one of a number of points at different distances from the axis of rotation of said crank, said motor being adaptable to rotate said crank and said crank being operative to reciprocate said box cutter through the medium of said connecting rod, said box cutter being constrained to reciprocate vertically to and from a point below said tractor, a jaw coacting with said cutter and operative to take up a position such that it closes the cutting end of said box cutter when the latter is substantially at the end of its downward stroke and to maintain such a position substantially throughout the upward stroke of said cutter and a discharge conduit having its inlet end telescopically fitting within said cutter in all positions of the latter, the length of said box cutter being at least as great as its maximum stroke.

4. A digging machine comprising in combination a tractor, a mechanically operated box cutter mounted upon said tractor, a motor operative to reciprocate said cutter also mounted on said tractor, said cutter being constrained to reciprocate to and from a point below said tractor, a jaw coacting with said cutter and operative to take up a position such that it closes the cutting end of said box cutter when the latter is substantially at the end of its downward stroke and to maintain such a position substantially throughout the upward stroke of said cutter, a discharge conduit, mounted upon said tractor, having its inlet end telescopically fitting within said box cutter in all positions of the latter, the length of said box cutter being at least as great as its stroke, and a conveyor adapted to be driven by said motor, said discharge conduit being arranged to discharge onto said conveyor.

5. A digging machine comprising in combination a tractor, a mechanically operated box cutter mounted upon said tractor, a motor operative to reciprocate said cutter, also mounted on said tractor, said cutter being constrained to reciprocate to and from a point below said tractor, a jaw mounted to reciprocate across the cutting edge of said cutter, means for positively moving said jaw to close said end of said cutter substantially at the end of the downward stroke of said cutter and means for positively withdrawing said jaw substantially at the beginning of the downward stroke of said cutter and a discharge conduit having its inlet end within said cutter in all positions of the latter, the length of said box cutter being at least as great as its stroke and the end of said discharge conduit being of such dimensions and cross-section that it fits said box cutter.

In testimony whereof, I have signed my name to this specification this 10th day of February, 1931.

ÁNGEL ESPANTOSO.